Patented Nov. 28, 1950

2,531,512

UNITED STATES PATENT OFFICE 2,531,512

PROCESS FOR MAKING SORBIC ACID ESTERS

Raymond I. Hoaglin and Donald H. Hirsh, Charleston, W. Va., assignors, by mesne assignments, to Union Carbide and Carbon Corporation, a corporation of New York No Drawing. Application November 5, 1946, Serial No. 707,976

6 Claims. (Cl. 260—486)

This invention relates to a method for making sorbic acid esters, which are valuable reactive intermediates by virtue of their conjugated system of double bonds.

According to this invention, sorbic acid esters are prepared by heating esters of 3,5-dialkoxyhexanoic acid in the vapor phase and removing two molecules of an alkanol per mole of the hexanoic acid esters, with the consequent introduction of two olefinic double bonds in the carbon chain. The over-all reaction may be represented as follows:

Alkyl 3,5-dialkoxyhexanoate

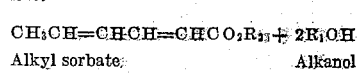

Alkyl sorbate          Alkanol where $R_1$ is a normal alkyl radical containing up to four carbon atoms, i. e. methyl, ethyl, propyl and butyl, and $R_2$ is any alkyl radical, such as a methyl, ethyl, butyl, hexyl or octyl radical.

The chemical reaction which occurs appears to proceed in two stages; the first stage involving the elimination of a single molecule of a lower alkanol to form an unsaturated ester containing a single olefinic double bond, since such unsaturated ester usually accompanies the sorbic ester as a by-product. However, upon further heating of the by-product monoolefinic compound, another molecule of the alkanol is split off, forming an ester of sorbic acid. The two stages of the reaction involved may be represented as follows by the use of a diethoxyhexanoic ester:

A.

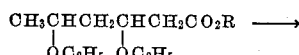

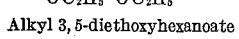

Alkyl 3,5-diethoxyhexanoate

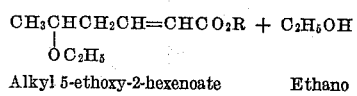

Alkyl 5-ethoxy-2-hexenoate        Ethano

B.

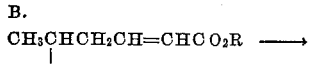

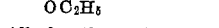

Alkyl 5-ethoxy-2-hexenoate

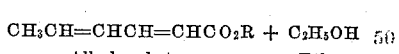

Alkyl sorbate         Ethano

Preferably the dialkoxyhexanoic acid ester is heated in the vapor phase at temperatures of 250° to 500° C. The reaction may be facilitated by the presence of a catalyst, but this is not essential. Suitable catalysts which we have used comprise the siliceous types, such as commercial forms of diatomaceous earth which are prepared in catalytically active form and silica gel, which is also available in catalytically active form. The diatomaceous earth catalysts may be used as supplied by the manufacturer. The silica gel is preferably dried before use.

We have found that the ester linkage of the alkyl dialkoxyhexanoate is not affected during the pyrolysis. On the other hand, 3,5-diethoxyhexanoic acid itself is not suitable as a feed material for making sorbic acid pyrolytically, because a side-reaction occurs resulting in the formation of an unsaturated hydrocarbon and considerable amounts of carbon dioxide. Furthermore, the sorbic esters are not exposed to conditions which favor their polymerization according to the present vapor phase process, and consequently these sorbic acid esters are produced in good yields and chemical efficiencies. The sorbic esters are exposed to high temperatures for brief periods only, since the exit vapors from the pyrolysis zone may be rapidly cooled and condensed. The ethanol formed may be recovered, and when ethyl sorbate is produced, used for esterifying the ethoxyhexanoic acid. The temperature of the reaction zone may be regulated within the range stated to control the rate of reaction, the reaction time being correspondingly proportioned to secure the desired conversion. However, temperatures of 350° to 400° C. are preferred with the rates of feed being about 0.25 to 0.50 volume of liquid alkyl 3,5-dialkoxyhexanoate fed per hour for each volume of reaction zone.

The following example will illustrate the procedural aspects of the invention:

*Example.—Production of ethyl sorbate*

A vapor-phase converter consisting of an electrically heated, liquid-jacketed tube was charged with 100 cc. of "Filtros" (a catalytically inert form of silica) at the bottom of the tube. Then 365 cc. of "Celite" Type VIII ($\frac{3}{16}$" x $\frac{3}{16}$") (a commercial form of diatomaceous earth) was placed on top of the "Filtros." An additional 420 cc. of "Filtros" was charged to the top section of the tube, which served as a vaporizer and preheater.

Ethyl 3,5-diethoxyhexanoate was fed as a liquid at the top of the tube at the rate of 132 cc. per hour. The temperature of the catalyst bed was about 375° C. The vapors were condensed and the product distilled. After recovering the coproduct ethanol, ethyl sorbate was obtained in 30.4% yield and ethyl 5-ethoxy-2-hexanoate was obtained in 28.8% yield. The yield of ethyl sorbate may be increased by recycling the ethyl 5-ethoxy-2-hexenoate together with the unchanged ethyl diethoxyhexanoate. The efficiency at which ethyl 3,5-diethoxyhexanoate was converted to useful products was approximately 93%.

The approximate boiling points of the three esters involved in this example are as follows:

Ethyl sorbate _____ 44° C. (2 mm. Hg)
Ethyl 5-ethoxy-2-hexenoate 78° C. (2 mm. Hg)
Ethyl 3,5-diethoxyhexanoate 75° C. (1 mm. Hg)

Thus, the ethyl sorbate may be readily recovered from the reaction products by distillation.

It is understood that the disclosed process is equally suitable for making other alkyl sorbates, such as methyl, propyl, butyl, amyl, 2-ethylhexyl and lauryl sorbates.

We claim:

1. Process for making an alkyl sorbate which comprises passing the vapors of an alkyl ester of a 3,5-dialkoxyhexanoic acid through a reaction zone containing a catalytically active form of silica at a temperature of 250° C. to 500° C., the alkyl group in said substituted alkoxy radicals being normal and containing from one to four carbon atoms, and recovering an alkyl sorbate from the reaction mixture.

2. Process for making ethyl sorbate which comprises passing the vapors of ethyl 3,5-diethoxyhexanoate through a reaction zone containing catalytically active diatomaceous earth at a temperature of 250° C. to 500° C., and recovering ethyl sorbate from the reaction products.

3. Process for making ethyl sorbate which comprises passing the vapors of ethyl 3,5-diethoxyhexanoate through a reaction zone containing silica gel at a temperature of 250° C. to 500° C., and recovering ethyl sorbate from the reaction products.

4. Process for making an alkyl sorbate which comprises passing the vapors of an alkyl ester of a 3,5-dialkoxyhexanoic acid in which the alkoxy groups are normal and contain from one to four carbon atoms through a reaction zone containing a catalytically active form of silica at a temperature of 250° C. to 500° C. to form a mixture containing an alkyl sorbate, a normal alkanol containing from one to four carbon atoms, and an alkyl 5-alkoxy-2-hexenoate, separating the alkyl sorbate and the alkanol from said mixture, and returning the alkyl 5-alkoxy-2-hexenoate to the reaction zone.

5. Process for making an alkyl sorbate which comprises passing the vapors of an alkyl ester of 3,5-diethoxyhexanoic acid through a reaction zone containing a catalytically active form of silica at a temperature of 250° C. to 500° C. to form a mixture containing an alkyl sorbate, ethanol, and an alkyl 5-ethoxy-2-hexenoate, separating the alkyl sorbate and the ethanol from said mixture, and returning the alkyl 5-ethoxy-2-hexenoate to the reaction zone.

6. Process for making ethyl sorbate which comprises passing the vapors of ethyl 3,5-diethoxyhexanoate through a reaction zone containing catalytically active diatomaceous earth at a temperature of 350° C. to 400° C., and recovering ethyl sorbate from the reaction products.

RAYMOND I. HOAGLIN.
DONALD H. HIRSH.

REFERENCES CITED

The following references are of record in the file of this patent:

UNITED STATES PATENTS

| Number | Name | Date |
|---|---|---|
| 2,378,501 | Ratchford et al. | June 19, 1945 |
| 2,393,737 | Bortnick | Jan. 29, 1946 |

FOREIGN PATENTS

| Number | Country | Date |
|---|---|---|
| 361,153 | Great Britain | Nov. 19, 1931 |